United States Patent Office 3,155,644
Patented Nov. 3, 1964

3,155,644
PRODUCTION OF HIGHLY OXIDIZED POLYOLEFINS
Clifton Leroy Kehr, Ednor, Md., assignor to W. R. Grace & Co., New York, N.Y., a corporation of Connecticut
No Drawing. Filed Oct. 26, 1961, Ser. No. 147,750
6 Claims. (Cl. 260—94.9)

This invention relates to the production of highly oxidized thermoplastic polyolefins having improved processing and adhesive properties. More specifically, this invention relates to the production of highly oxidized polyethylene having improved processing and adhesive properties.

In summary, this invention is directed to a process for producing highly oxidized polyethylene which comprises treating polyethylene having a melt index in the range of about 0.0 to 25 as measured under the conditions specified in ASTM D1238–52T with an oxygen-containing vapor at a temperature in the range of 100 to 200° C. until the polyethylene is oxidatively degraded to a product having a higher melt index in the range of about 5 to 1000, incorporating therein a stibilizing amount of an antioxidant to quench the oxidation process and treating the resulting polyethylene product with 0.5 to 60 weight percent of a metallic base at a temperature in the range of about 100 to 180° C. until the polyethylene is converted to a polymeric metallo-carboxylate with a melt index in the range of about 0.1 to 50 by salt formation between the metallic cation of said metal base and the carboxyl groups of the oxidized polyethylene.

Melt index is a measure of polyethylene flow at a standard condition of temperature, pressure and time through an orifice of defined diameter and length as specified in ASTM D1238–52T. The rate of extrusion in g./10 minutes is the melt index, and it is used to indicate the average molecular weight of a polymer. The lower the molecular weight of a polymer the more rapidly it extrudes, and therefore, melt index increases as polymer molecular weight decreases. Normal grades of polyethylene have a melt index ranging from about 0.1 to 5.0 or higher, depending on the intended use of the material.

Polyethylene materials, such as films, sheets, coatings, and manufactured articles, e.g., bottles and other vessels, are well known in the art today. These materials, however, due to their inert nature, display poor receptivity for other materials. In recent years various treating processes and techniques have been developed to oxidize the surfaces of polyethylene structures to increase their adhesiveness toward other materials. These treating techniques have resulted in improving the adherence between polyethylene structures and substrate materials, dried ink impressions, various coating compositions, etc. In addition, these treatments are valuable for improving the bond strength between polyethylene surfaces and other base materials such as glass, wood, paper and metals, when standard adhesive techniques are employed to effect bonding. Some of the well known treatments for improving the adhesiveness of polyethylene structures include treatment of the polyethylene surface with a gas flame or with an acid dichromate solution. These treatments introduce polar oxygenated functional groups into the polyethylene but have been limited to the surface of the molded polyethylene structure.

The bulk oxidation of polyethylene introduces polar oxygenated functional groups more or less homogeneously throughout the entire bulk of the polymer. However, bulk oxidation of normal grades of polyethylene produces only low molecular weight, extremely fluid polyethylene materials which are difficult to process.

I have found that I can reduce the melt index, i.e. the fluidity of oxidized polyethylene, by treating it with a metallic base. The resulting polymeric metallo-carboxylate has improved processing characteristics in addition to improved adhesive properties.

The process by which the polyehtylene is oxidized is not critical. For example, the polyethylene can be milled in air at a temperature in the range of 100 to 200° C. Another method includes placing the polyethylene in particle form in an oven and passing air over it at a temperature of about 100 to 138° C. Still another method is to suspend particles of the polyethylene in water, or an organic solvent, and bubble air through the suspension. Yet another method is to pass air at a temperature in the range of 100 to 138° C. through a fluidized bed of polyethylene particles. Accelerators such as ultraviolet light can be used. In general, the invention is operable where the oxidized polyethylene has a melt index in the range of about 5 to 1000 although a melt index in the range of about 10 to 500 is preferred.

The oxidative process can be quenched at any desired level of oxidation by any suitable means as, for example, adding a suitable antioxidant, such as N-phenyl-2-napthylamine or Santonox (4,4′ thiobis(6-t-butyl meta-cresol)). Another method of quenching is to quickly cool the oxidized product to room temperature.

The amount of base added to the oxidized polyethylene is not critical. Amounts as little as 0.5 weight percent based on the weight of the polyethylene show a definite effect on decreasing the fluidity of the oxidized polymer. In general, from 0.5 to 10 weight percent of base is preferred although the invention is operable with as much as 60 weight precent. The invention is operable to convert the oxidized polyethylene to a polymeric metallo-carboxylate with a melt index in the range of about 0.1 to 50 although it is generally preferred to convert the oxidized polyethylene to a polymeric metallo-carboxylate with a melt index in the range of about 0.2 to 10.

The basic agents for use in the method of this invention are certain of the inorganic metal oxides, hydroxides, or alkoxides, namely, aluminum n-butoxide [$Al(OC_4H_{11})_3$], magnesium oxide (MgO), sodium methylate ($NaOCH_3$) and calcium hydroxide [$Ca(OH)_2$].

The invention is also operable with other polymers as, for example, polypropylene and copolymers of ethylene such as ethylene/butene-1 copolymers, ethylene/propylene copolymers, etc. The following examples are set down to illustrate the invention and are not deemed to limit its scope. Throughout the instant invention tests were conducted as follows:

The extent of oxidation of the polyethylene was determined by ascertaining the carbonyl content of the polymer by infrared analysis using the peak at 1720 cm.$^{-1}$. By the word "carbonyl" is meant primarily ketone and aldehyde groups. A Perkin-Elmer spectrophotometer, Model 221, was used. The reported percent carbonyl is equal to $$\frac{\text{Gms. C=O}}{\text{Gms. polymer}} \times 100$$

Melt indices (MI) were measured under the conditions specified in ASTM D1238–52T.

Densities of the polymer were measured under the conditions specified in ASTM D1505–57T.

Crystalline melting point is the temperature at which all crystallinity disappears from the sample and it appears clear when viewed through crossed Nicol prisms in a hot-stage microscope heated at a rate <1°/min.

Solution viscosity, $\eta_{sp/c}$, were obtained by dissolving 0.1 g. of the polymer in 100 cc. Decalin at 135° C.

The oxidized polyethylene was milled with the base in a Brabender Plastograph (Moded P1–V2) which was equipped with a recording unit for measuring changes in torque. The recording unit had a range of 0 to 1000 units equal to 0 to 1 meter-kilograms (m. kg.) of torque.

This range can be increased when necessary to 0 to 5000, i.e., equal to 0 to 5 meter-kilograms of torque by the addition of weights.

Unless otherwise noted, all parts and percentages are by weight in the examples.

EXAMPLE 1

1000 grams of commercial polyethylene in flake form with a melt index of 0.7, a density of 0.96, a solution specific viscosity of 2.1 and a crystalline melting point of 135° C. were placed in a basket constructed from 40 x 40 mesh stainless steel wire cloth. The basket of polymer was placed on the bottom shelf of a Fisher Isotemp Forced-Draft oven maintained at a temperature of 128±2° C. The basket was placed on top of several 7 mm. glass rods to permit air circulation beneath as well as around and over the top of the basket. At the end of 20 hours the polyethylene was removed from the oven and cooled to room temperature to quench the oxidation process. The thus-oxidized polyethylene material was processed through a Wiley mill (coarse screen) and then placed in a jar and blended for about 5 minutes on the roller mill to assure maximum homogeneity. The product had a melt index of 200 and a solution specific viscosity of 0.58.

39 grams of the oxidized polyethylene were charged into a Brabender Plastograph mixing head open to the atmosphere and maintained at a temperature of about 160° C. 0.20 gram of N-phenyl-2-naphthylamine was added to prevent further oxidative degradation of the polymer during the milling cycle. After milling for 10 minutes, the recorder plotted a constant torque indicating that the polymer was in an equilibrium molten condition. The blades were then stopped momentarily to permit removal of 4 grams of the polymer to be used as a control sample. Mixing was resumed and 0.72 gram (2 wt. percent) magnesium oxide was added. The polyethylene then changed from a fluid liquid (at 160° C.) to a tough, stiff, highly viscous semi-solid at the same temperature. An increase in torque ($\Delta\gamma$) of 1.54 meter kg. was measured from the time the magnesium oxide was added to the time a leveling off point was recorded. The product had a melt index of 3.9.

The control sample was pressed into a film and analyzed by infrared for carbonyl- content (1720 cm.$^{-1}$ band). A sample of the magnesium oxide treated polyethylene was also pressed into a film and similarly analyzed for carbonyl content. The magnesium oxide treated polyethylene had a lower concentration of carbonyl groups than the control sample. The carboxyl-carbonyl content of the sample, therefore, was obtained by measuring this net decrease in carbonyl content. In this instance, weight percent carboxyl-carbonyl was found to be 0.10.

EXAMPLE 2

Using the apparatus and procedure described in Example 1, adddtional runs were conducted illustrating the invention. The different samples of oxidized polyethylene used represent increasing levels of oxidation as defined by the carboxyl-carbonyl concentration of each product. The results showing the effect on flow properties are tabulated in Table I.

Table I

| Run | Wt. Percent Carboxyl-Carbonyl | Δ Torque After Adding 2% MgO, meter kg. | Melt Index | |
|---|---|---|---|---|
| | | | Before MgO | After MgO |
| 1 | 0.02 | 0.93 | >10 | 3.5 |
| 2 | 0.04 | 1.02 | >10 | 6.3 |
| 3 | 0.05 | 1.22 | >10 | 7.3 |
| 4 | 0.15 | 1.38 | >10 | 6.8 |
| Control | 0.00 | nil | 0.85 | 0.74 |

EXAMPLE 3

Magnesium oxide treated polyethylene produced according to Example 1 was ground to a powder. A clean circular aluminum ash tray was placed in an oven on a stand and heated to a temperature of 200° C. The ash tray was then removed and quickly dipped into the powdered polyethylene. The tray was worked through the powder with a rotating motion for a moment or two in order to allow all parts of the tray to come into intimate contact with the powder and pickup a uniform coating. On removal, the excess powder was shaken off, and the ash tray was placed in another oven maintained at 140° C. until the powder fused to a smooth coat. The tray was then removed from the oven and allowed to cool to room temperature.

The polyethylene coating gripped the metal so tightly that it could not be peeled off.

EXAMPLE 4

This example illustrates the effect of various bases on oxidized polyethylene. Commercial polyethylene in flake form with a melt index of 0.7, a density of 0.96, and a crystalline melting point of 135° C. was oxidized as described in Example 1. The oxidized polymer had a weight percent carboxyl content of 0.10 as determined by infrared analysis. The milling procedure described in Example 1 was followed and the test results are listed in Table II.

Table II

| Run | Base Used, 2% By Wt. | Wt. Percent Carboxyl-Carbonyl | Δ Torque After Adding 2% Base, meter kg. | Melt Index | |
|---|---|---|---|---|---|
| | | | | Before Base | After Base |
| 1 | Al(OC$_4$H$_{11}$)$_3$ | .19 | 1.73 | 250 | 0.5 |
| 2 | MgO | .11 | 1.72 | 250 | 4.9 |
| 3 | NaOCH$_3$ | .10 | 1.33 | 250 | 2.4 |
| 4 | Ca(OH)$_2$ | .06 | 0.96 | 250 | 4.5 |
| 5 | CaO | .20 | 0.63 | 250 | >10 |
| 6 | SrO | .15 | 0.51 | 250 | >10 |
| 7 | Mg(OH)$_2$ | .13 | 0.20 | 250 | >10 |
| 8 | Ba(OH)$_2$ | .08 | 0.11 | 250 | >10 |
| 9 | ZnO | .06 | 0.06 | 250 | >10 |
| 10 | BaO | .13 | 0.04 | 250 | >10 |
| 11 | Al(OC$_2$H$_5$)$_3$ | .007 | 0.01 | 250 | >10 |

EXAMPLE 5

35 grams of commercial polyethylene in flake form having a melt index of 0.7, a density of 0.96 and a crystalline melting point of 135° C. were charged into a Brabender Plastograph mixing head open to the atmosphere and maintained at a temperature of 160° C. 0.20 gram of N-phenyl-2-naphthylamine was added to prevent oxidative degradation of the polymer during the milling cycle. After milling for 10 minutes, the recorder plotted a constant torque indicating that the polymer was in an equilibrium molten condition. 1.8 grams of stearic acid were added and milling was continued for about 5 minutes. 0.72 gram (2 wt. percent) of magnesium oxide was then added and milling was continued for 20 minutes. No increase in torque was recorded.

The above procedure was repeated except that sodium methylate was substituted for magnesium oxide. No increase in torque was recorded.

Apparently, the carboxylate group must be attached to the polyethylene chains before an increase in torque will result.

The oxidized polyethylene of this invention is useful wherever a need for a polyethylene with improved flow properties along with improved adhesive characteristics exists. It is especially useful as a protective or decorative surface coating for wood, metal, glass, paper, concrete, etc. It is also useful as an adhesive between rigid substrates such as metal-to-metal, wood-to-wood, etc. In addition, it displays good receptivity for printing inks.

I claim:
1. A process for producing highly oxidized polyethylene having improved adhesive properties which comprises treating polyethylene having a melt index in the range of about 0.0 to 25 with a free oxygen-containing vapor at a temperature in the range of 100 to 200° C. until the polyethylene is oxidatively degraded to a product having a higher melt index in the range of about 5 to 1000, quenching the oxidation process and treating the resulting product with 0.5 to 60 weight percent of a metallic base selected from the group consisting of magnesium oxide, aluminum butoxide, sodium methylate and calcium hydroxide at a temperature in the range of about 100 to 180° C. until the polyethylene is converted to a polymeric metallo-carboxylate with a melt index in the range 0.1 to 50 by salt formation between the metallic cation of said metal base and the carboxyl groups of the oxidized polyethylene.
2. An oxidized polyethylene resulting from the process defined in claim 1.
3. The process according to claim 1 wherein the oxygen-containing vapor is air.
4. The process according to claim 3 in which polyethylene in particle form is treated with air at a temperature in the range of 100 to 138° C.
5. The process according to claim 4 which comprises milling the polyethylene in air.
6. The process for producing highly oxidized polyethylene having improved adhesive properties which comprises treating polyethylene in particle form having a melt index in the range of about 0.0 to 25 with air at a temperature in the range of 100 to 138° C. until the polyethylene is oxidatively degraded to a product having a higher melt index in the range of about 5 to 1000, incorporating therein a stabilizing amount of N-phenyl-2-naphthylamine antioxidant to quench the oxidation process, and treating the resulting product with 0.5 to 60 weight percent of a metallic base selected from the group consisting of magnesium oxide, aluminum butoxide, sodium methylate and calcium hydroxide at a temperature in the range of about 100 to 180° C. until the polyethylene is converted to a polymeric metallo-carboxylate with a melt index in the range of about 0.1 to 50 by salt formation between the metallic cation of said metal base and the carboxyl groups of the oxidized polyethylene.

References Cited in the file of this patent

UNITED STATES PATENTS 2,985,617     Salyer et al. _____ May 27, 1961

FOREIGN PATENTS 476,476     Canada _____ Aug. 28, 1951